United States Patent
Mysore et al.

(10) Patent No.: US 8,346,081 B2
(45) Date of Patent: Jan. 1, 2013

(54) SMART RF OVER GLASS (RFOG) CPE UNIT WITH SEAMLESS PON UPGRADE CAPABILITY

(75) Inventors: Sudhesh Mysore, Carlsbad, CA (US); Charles Barker, Sunnyvale, CA (US); Oleh Sniezko, Highlands Ranch, CO (US); Krzysztof Pradzynski, Santa Clara, CA (US)

(73) Assignee: Aurora Networks, Inc., Santa Clara, CA (US)

( * ) Notice: Subject to any disclaimer, the term of this patent is extended or adjusted under 35 U.S.C. 154(b) by 473 days.

(21) Appl. No.: 12/587,889

(22) Filed: Oct. 13, 2009

(65) Prior Publication Data
US 2010/0142949 A1 Jun. 10, 2010

Related U.S. Application Data

(60) Provisional application No. 61/195,805, filed on Oct. 10, 2008.

(51) Int. Cl.
*H04J 14/00* (2006.01)
(52) U.S. Cl. .............. 398/72; 398/58; 398/66; 398/67; 398/70; 398/71; 398/116
(58) Field of Classification Search ............... 398/58–79
See application file for complete search history.

(56) References Cited

U.S. PATENT DOCUMENTS

| | | |
|---|---|---|
| 6,978,091 B1 | 12/2005 | Needle |
| 2003/0081619 A1* | 5/2003 | Phillips et al. ............ 370/400 |
| 2003/0128983 A1 | 7/2003 | BuAbbud et al. |
| 2004/0184806 A1* | 9/2004 | Lee et al. ............... 398/79 |
| 2005/0053376 A1 | 3/2005 | Joo et al. |
| 2006/0039357 A1 | 2/2006 | Kim et al. |
| 2006/0067705 A1 | 3/2006 | Paulsen |

FOREIGN PATENT DOCUMENTS

WO  WO 01/74077 A1  10/2001

OTHER PUBLICATIONS

Park et al: "Fiber-to-the-Home Services based on Wavelength-Division-Multiplexing Passive Optical Network", Journal of Lightwave Technology, vol. 22, No. 11, Nov. 2004, pp. 2582-2591.*
Soo-Jin Park et al., Fiber-to-the-home services based on wavelength-division-multiplexing passive optical network, Journal of Lightwave Technology, vol. 22, No. 11, Nov. 2004.

* cited by examiner

*Primary Examiner* — Li Liu
(74) *Attorney, Agent, or Firm* — John Bruckner PC (57) ABSTRACT

Methods and apparatus are described for "Smart" RF over Glass (RFoG) CPE Unit with Seamless PON Upgrade Capability. A method includes operating a customer premises equipment device including transporting upstream cable return services with a laser; and switching a drive source for the upstream laser from an analog driver to a digital driver by using a managed electrical switch to reuse a wavelength of the laser. An apparatus includes a customer premises equipment device including a laser for transporting upstream cable return services; and a managed electrical switch coupled to the laser that is used to switch a drive source for the upstream laser to reuse a wavelength of the laser.

5 Claims, 13 Drawing Sheets

SMART RF OVER GLASS (RFOG) CPE UNIT WITH SEAMLESS PON UPGRADE CAPABILITY

CROSS-REFERENCE TO RELATED APPLICATION

This application claims a benefit of priority under 35 U.S.C. 119(e) from copending provisional patent application U.S. Ser. No. 61/195,805, filed Oct. 10, 2008, the entire contents of which are hereby expressly incorporated herein by reference for all purposes.

BACKGROUND INFORMATION

1. Field of the Invention

Embodiments of the invention relate generally to the field of communications networking. More particularly, an embodiment of the invention relates to methods of and apparatus for "Smart" RF over Glass (RFoG) CPE Unit with Seamless PON Upgrade Capability.

2. Discussion of the Related Art

Telephone companies such as Verizon and AT&T have started to offer services over fiber-to-the-premise (FTTP) and fiber-to-the-curb (FTTC) systems such as FiOS™ and U-Verse™. These systems offer dramatically higher data bandwidths by bringing optical fiber to the home or close to home. In order to maintain their upper hand in bandwidth per customer, North American cable operators started deploying scalable fiber-to-the-home (FTTH) systems, building upon fiber deployed to date in new builds and upgrades that can offer similar to, or higher than, bandwidths provided by FiOS™ and U-Verse™.

MSOs want to continue utilizing DOCSIS platform for wideband services such as high speed data, Voice over IP (VoIP) and other services supported by this platform, which provides for downstream data bandwidth up to 640 Mb/s or more, until such a time as yet higher data speeds are required. At such a time, the MSOs want the flexibility to upgrade their FTTH CPE device to handle Gb/s data speeds offered by passive optical networks (PONs) such as GPON or GEPON. They also want to support deployed interactive TV services that are based on set top boxes with active upstream signaling to support fully interactive services such as Video on Demand (VoD) and Switched Digital Video (SDV).

RF over Glass (RFoG) is the name given to the generic FTTH architecture that supports both legacy DOCSIS cable upstream signals and an optional future expansion to additional high speed (>1 Gb/s) PON service. However, deploying cost-effective RFoG system makes future expansion of this system with GPON or GEPON more difficult. The RFoG transmitters used to transmit upstream DOCSIS signals and set top box upstream signaling information for interactive TV, and placed in the CPE utilize a low-cost 1310 nm laser, which is the same wavelength as that used by upstream PON signals. The solution has been to use a different wavelength, usually 1590 nm, to transport the cable upstream signal and 1310 nm to transport the upstream PON signal. For systems that initially deployed 1310 nm upstream lasers, the expansion would result in replacing and obsolescing these deployed lasers with much higher cost CPE devices.

Figure 1:
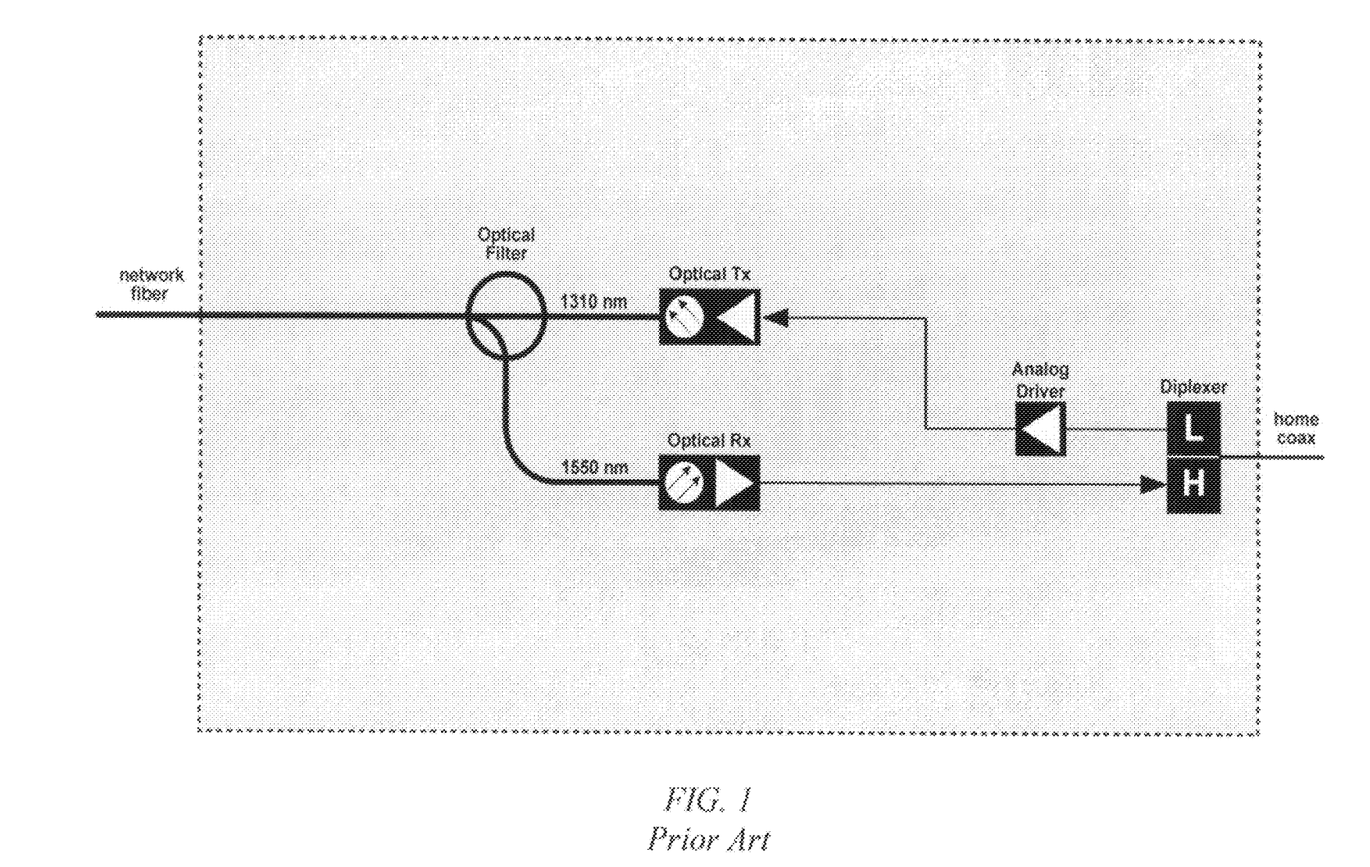
FIG. 1 depicts a schematic diagram of an RFoG CPE device (Version A) that provides only traditional cable services (using 1550 nm down/1310 nm up wavelengths) and no PON, appropriately labeled "PRIOR ART."

FIG. 1 shows the schematic diagram of one type ("Version A") of customer-premise-equipment (CPE) device used by cable operators building an RFoG system. The Version A CPE device is a low-cost device that provides only traditional cable services and no PON. The CPE device uses an optical filter to separate the downstream 1550 nm signal from the upstream 1310 nm signal. This filter is not deployed if two fibers are used, one for downstream and one for upstream. The CPE device uses a relatively low-cost 1310 nm laser for transmitting upstream signals and an optical receiver for detecting the downstream 1550 nm signal. The two paths are combined using a RF diplex filter onto the home coaxial cable.

Figure 2:
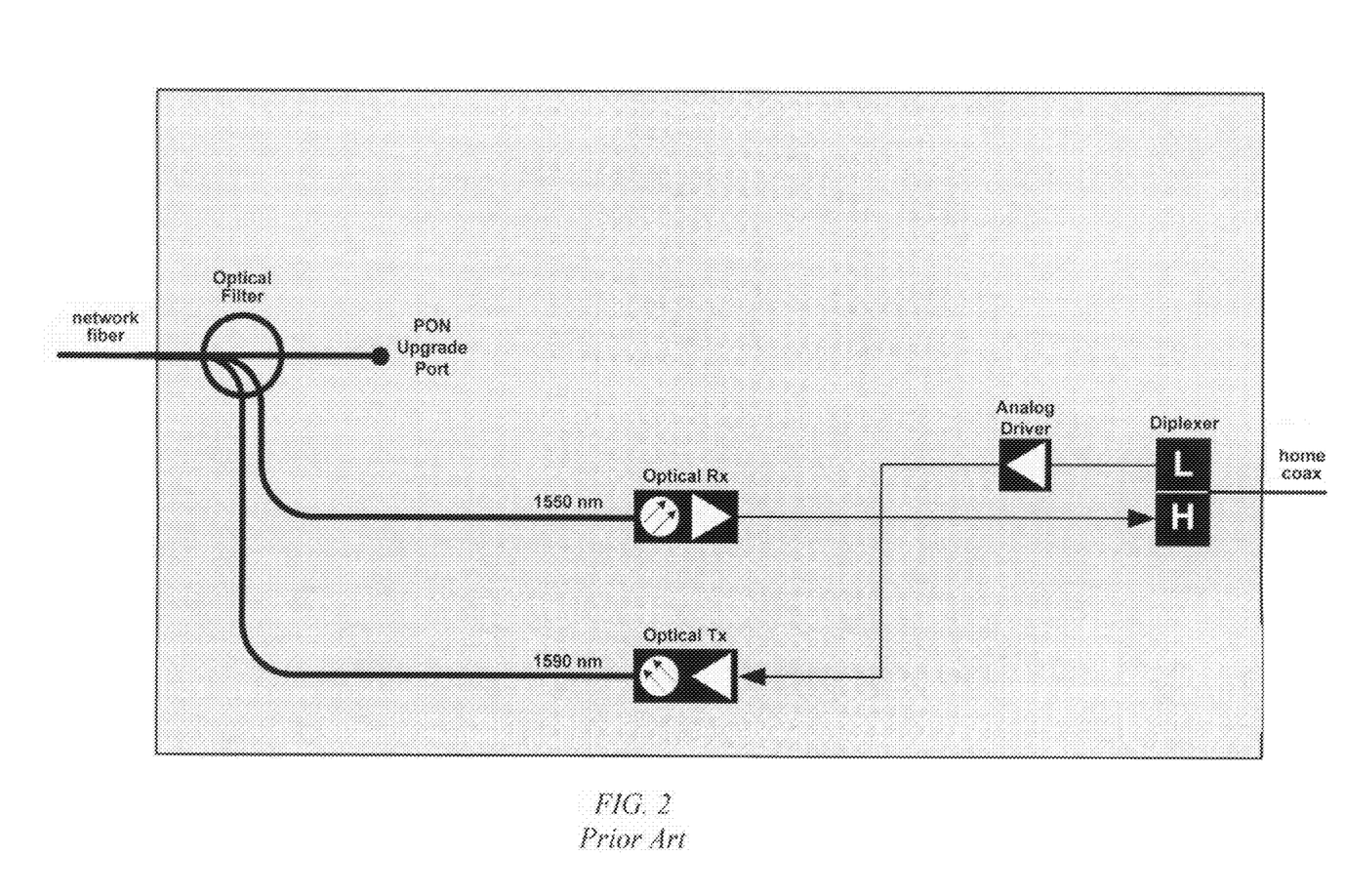
FIG. 2 depicts a schematic diagram of a higher-cost RFoG CPE device (Version B) that also provides only traditional cable services (using 1550 nm down/1590 nm up wavelengths) and no PON, appropriately labeled "PRIOR ART."

FIG. 2 shows the schematic diagram of a higher-cost RFoG CPE device ("Version B"). This CPE also supports only traditional cable services and no PON, but uses a 1590 nm laser to transport the upstream signals. The advantage of a Version B CPE device is that it uses 1590 nm for the cable upstream and hence does not conflict with the 1490 nm/1310 nm (down/up) wavelengths standardized in a PON system. Consequently, Version B can offer a PON upgrade port for the future addition of a PON system.

A disadvantage of the Version B CPE device is that 1590 nm lasers are currently significantly higher in price than 1310 nm lasers due to lower demand and higher performance requirements. Cable operators have to decide whether to start with the Version A CPE, which requires lower initial capital expenditures (capex) but has to be replaced when PON service has to be added, or with Version B, which requires a higher initial capex but does not need to be replaced when PON service has to be added at some point in the future. Since initial PON penetration rates are expected to be low, and due to the importance placed on low initial capital expenditure, many cable operators will start with the Version A CPE even though this will result in stranded capex at some point in the future when they have to implement PON service.

Figure 3:
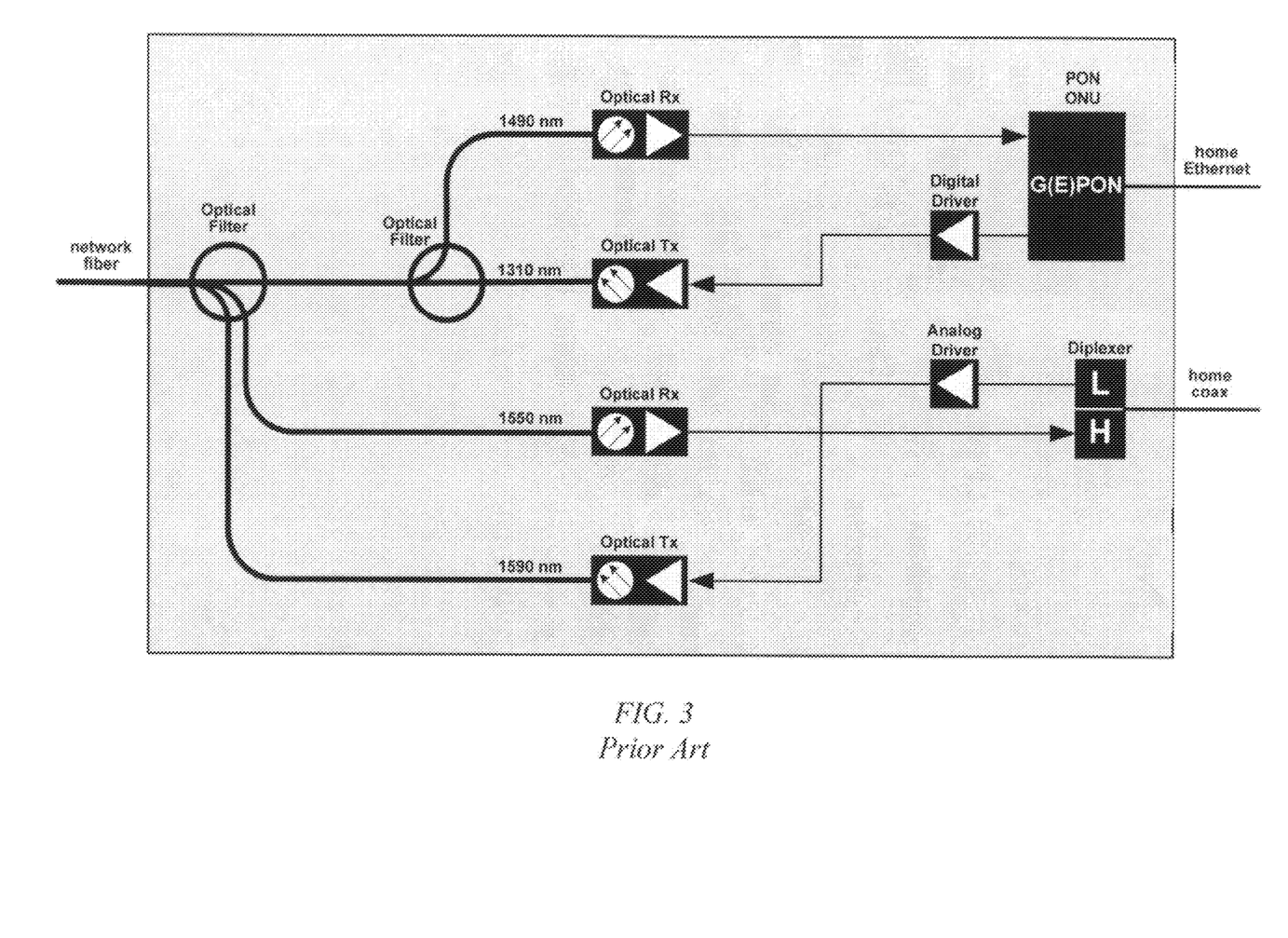
FIG. 3 depicts a schematic diagram of an RFoG CPE device (Version C) that provides both traditional cable services (using 1550 nm down/1590 nm up wavelengths) and PON service (using 1490 nm down/1310 nm up wavelengths), appropriately labeled "PRIOR ART."

FIG. 3 shows a third version of the RFoG CPE device ("Version C") which represents the Version B CPE device upgraded to PON service by the addition of an Optical Network Unit (ONU). The PON ONU transmits upstream at 1310 nm and receives downstream signals at 1490 nm. A second optical filter is used to separate the two PON wavelengths.

The Version C CPE device would be used to provide both traditional cable services and PON service to residences. It could also be used to provide PON service to small-to-medium businesses (SMBs) although in this case the traditional cable portion of the CPE device (carried by the 1310 nm laser) would likely not be used and would represent wasted capex.

The quandary faced by cable operators building FTTH systems is that regardless of what version of RFoG CPE devices currently available they choose to use (Version A, B or C) the result will be either stranded capex (when upgrading to PON from Version A) or higher initial capex (when starting from Version B) or wasted capex (when using Version C for business services).

SUMMARY OF THE INVENTION

There is a need for the following embodiments of the invention. Of course, the invention is not limited to these embodiments.

According to an embodiment of the invention, a process comprises: operating a customer premises equipment device including transporting upstream cable return services with a laser; and switching a drive source for the upstream laser from an analog driver to a digital driver by using a managed electrical switch to reuse a wavelength of the laser. According to another embodiment of the invention, an apparatus comprises: a customer premises equipment device including a laser for transporting upstream cable return services; and a managed electrical switch coupled to the laser that is used to switch a drive source for the upstream laser to reuse a wavelength of the laser.

These, and other, embodiments of the invention will be better appreciated and understood when considered in conjunction with the following description and the accompanying drawings. It should be understood, however, that the following description, while indicating various embodiments of the invention and numerous specific details thereof, is given for the purpose of illustration and does not imply limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer concept of embodiments of the invention, and of components combinable with embodiments of the invention, and operation of systems provided with embodiments of the invention, will be readily apparent by referring to the exemplary, and therefore nonlimiting, embodiments illustrated in the drawings (wherein identical reference numerals (if they occur in more than one view) designate the same elements). Embodiments of the invention may be better understood by reference to one or more of these drawings in combination with the following description presented herein. It should be noted that the features illustrated in the drawings are not necessarily drawn to scale.

DESCRIPTION OF PREFERRED EMBODIMENTS

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiment of the invention can include several versions of a "smart" RFoG CPE device that eliminates the possibility of stranded capital expenditure or higher initial capex (capital expenditure) by using a low-cost laser (wavelength $\lambda_{u1}$, typically 1310 nm) for transporting traditional cable return services initially but then reusing this wavelength to transport upstream PON service when required. The smart CPE features a managed electrical switch that is used to switch the drive source for the upstream laser from an analog driver (supporting traditional upstream cable signals of which examples were listed above) initially to a digital driver (providing upstream PON) when a PON upgrade is later desired (for example in residential areas). The switch also makes the initial CPE universal (can be deployed in residential or business areas for either type of services: DOCSIS and interactive video for residences or high speed PON data for businesses).

An embodiment of the invention can include a "smart" RFoG CPE device to provide Gb/s or higher PON service and/or traditional cable service to home subscribers and/or SMBs using different combinations of optional plug-in modules in a base CPE model. The base model includes an upstream laser, two optical receivers, a wavelength separator, an electrical switch to switch the laser drive source and a RF splitter.

An embodiment of the invention can include modules having a Cable Module (analog laser driver and a RF diplexer), Filter Module (optical filter for adding a second wavelength laser), Laser Module (a second upstream laser) and a PON Module (digital driver and a PON ONU).

An embodiment of the invention can include a "smart" RFoG CPE device that makes use of a managed electrical switch that can switch the drive source for a upstream laser (wavelength $\lambda_{u1}$ typically 1310 nm) from an analog driver initially (providing traditional upstream cable signals) to a digital driver (providing upstream PON) when a PON upgrade is desired, or vice versa. The $\lambda_{u1}$ laser, initially used to transport traditional cable return services, is reused to transport upstream PON service when required, thereby preserving the initial capital expenditure.

An embodiment of the invention can include a different combination of modules that plug into a base CPE device that provides many options on initial cost, type of service offered as well as type of customers targeted (home or SMB).

An embodiment of the invention can include a smart RFoG CPE device with Cable Module installed to provides traditional cable services to home subscribers.

An embodiment of the invention can include a smart RFoG CPE device with Cable and Filter modules installed to enable a seamless upgrade to PON service in the future.

An embodiment of the invention can include a smart RFoG CPE device with Cable, Filter and PON modules installed so that a future upgrade to PON service requires only the Laser module.

An embodiment of the invention can include a smart RFoG CPE device with Cable and PON modules installed so that a future upgrade to PON service requires the Laser and Filter modules.

An embodiment of the invention can include a smart RFoG CPE device with electrical switch set to "PON" and all modules installed to provide both traditional cable and PON services to both home and SMB customers.

An embodiment of the invention can include a smart RFoG CPE device with electrical switch set to "PON" and PON module installed to provide PON service to SMBs (and some home subscribers as well).

An embodiment of the invention can include a smart RFoG CPE device with PON and Filter modules installed for seamless upgrade to traditional cable services in the future.

An embodiment of the invention can include a smart RFoG CPE unit with PON module and a cable pass-through installed to provide PON and broadcast-only video services.

An embodiment of the invention can include a smart RFoG CPE unit with PON and Filter modules as well as a cable pass-through installed to provide PON and broadcast-only video services with seamless upgrade to traditional two-way cable services in the future.

EXAMPLES

Specific embodiments of the invention will now be further described by the following, nonlimiting examples which will serve to illustrate in some detail various features. The following examples are included to facilitate an understanding of ways in which an embodiment of the invention may be practiced. It should be appreciated that the examples which follow represent embodiments discovered to function well in the practice of the invention, and thus can be considered to constitute preferred mode(s) for the practice of the embodiments of the invention. However, it should be appreciated that many changes can be made in the exemplary embodiments which are disclosed while still obtaining like or similar result without departing from the spirit and scope of an embodiment of the invention. Accordingly, the examples should not be construed as limiting the scope of the invention.

Base Version of Smart CPE Device

Figure 4:
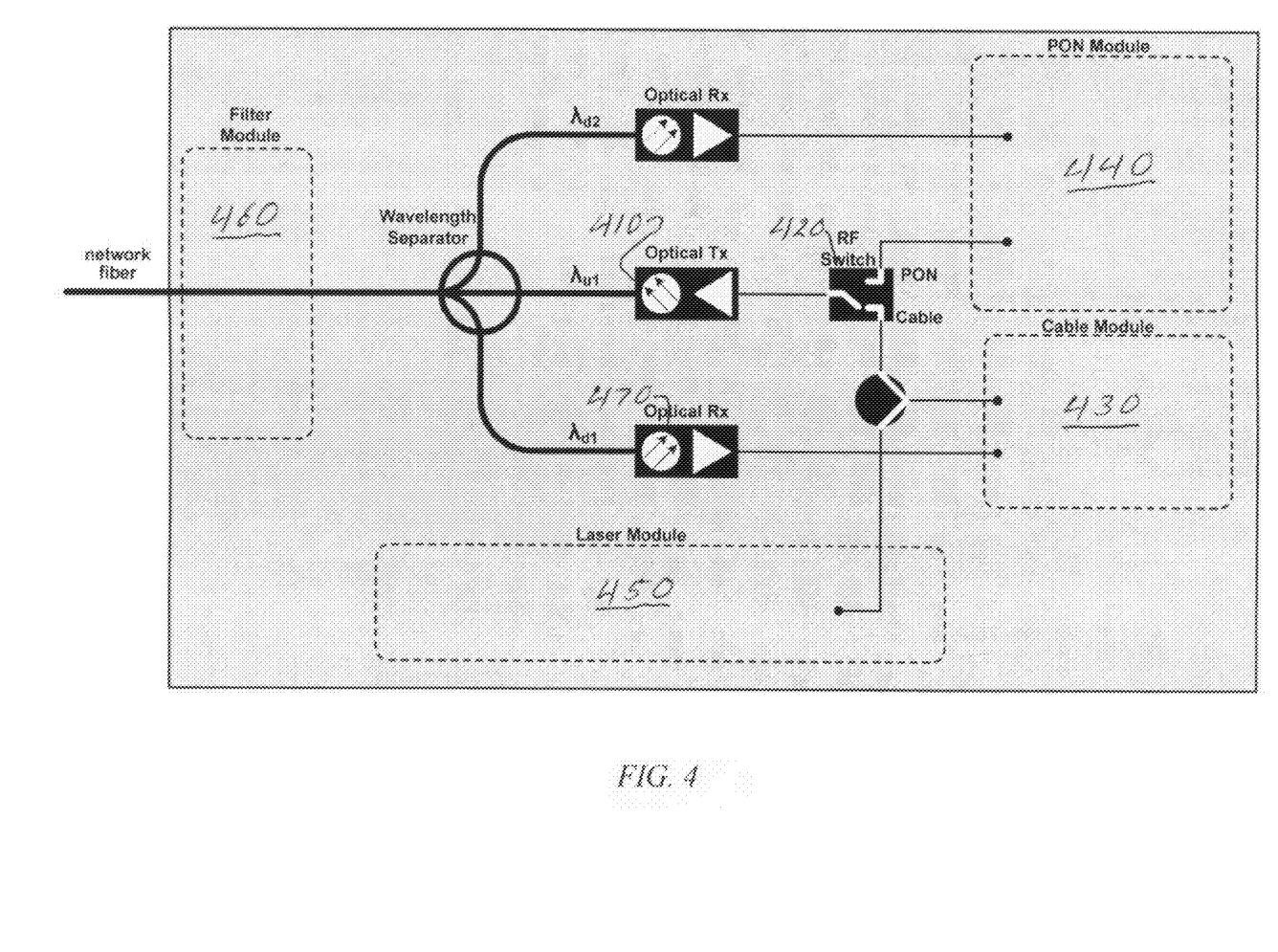
FIG. 4 depicts a base version of a "smart" RFoG CPE device that can be upgraded to many different configurations using optional plug-in modules.

FIG. 4 shows the schematic diagram of a base version of the smart CPE (customer premises equipment). The dotted rectangles show where optional plug-in modules would be inserted as needed for future upgrades. This CPE device can be configured for traditional cable services (broadcast-only video, video-on-demand, DOCSIS data and telephony, HDTV, etc.) and/or high-speed (Gb/s or higher) GPON/GEPON service. The CPE device can be configured so that the initial service provided is either traditional cable or PON service. Hence, it can be configured for home subscribers or SMBs.

The base version of the smart CPE device has a single upstream laser 410 with wavelength $\lambda_{u1}$ (1310 nm for example) driven by a source that is selected by an electrical switch 420. With the electrical switch 420 set to the "Cable" position (as shown in FIG. 4) the upstream laser is driven by an analog driver in the "Cable Module" 430 so that traditional cable services and upstream signals can be supported. With the electrical switch set to the "PON" position, the upstream laser is driven by a digital driver that provides high-speed G(E)PON service.

The Cable Module 430 has an analog driver to drive the upstream laser and a RF diplexer for combining the upstream and downstream RF signals onto the home coaxial cable. The PON module 440 includes an ONU that utilizes standard GPON/GEPON chip sets (from any of a number of manufacturers) and a digital transmitter to drive the $\lambda_{u1}$ laser.

The Laser Module 450 includes a second return laser with wavelength $\lambda_{u2}$ (typically 1590 nm or 1610 m) to carry a secondary service. The "Filter Module" 460 is for an optical filter that provides for the overlay of a secondary service over the $\lambda_{u2}$ wavelength. The base model also includes an optical receiver 470 for detecting the standard downstream broadcast video services over wavelength $\lambda_{d1}$ (typically 1550 nm).

CPE Model Equipped with Cable Module for Cable Service to Home Subscribers

Figure 5:
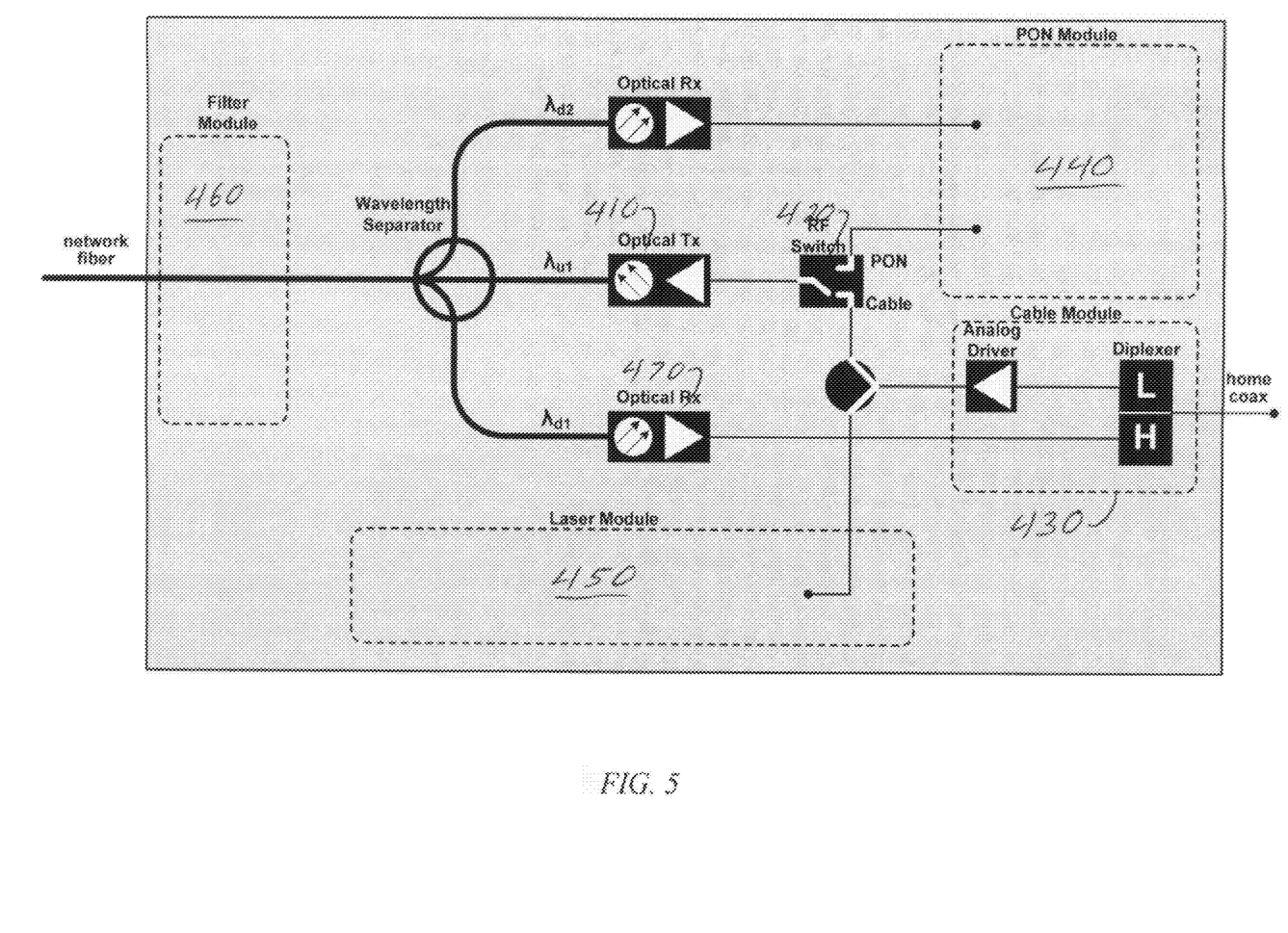
FIG. 5 depicts a smart RFoG CPE device with Cable Module installed and electrical switch set to "Cable" that provides traditional cable services only.

FIG. 5 shows the schematic diagram of a base CPE with the cable module installed. This CPE model would be used for home subscribers who are initially interested in getting traditional cable services only.

With the electrical switch 420 set to the "Cable" position and the Cable Module 430 installed, traditional cable services can be offered over the two wavelengths (wavelength $\lambda_{u1}$ upstream and wavelength $\lambda_{d1}$ downstream). An expensive second laser (usually 1590 nm or 1610 nm in the conventional RFoG architecture) is not yet required so the initial capital expenditure is minimized.

CPE Model Equipped with Cable and Filter Modules for Seamless PON Upgrade

Figure 6:
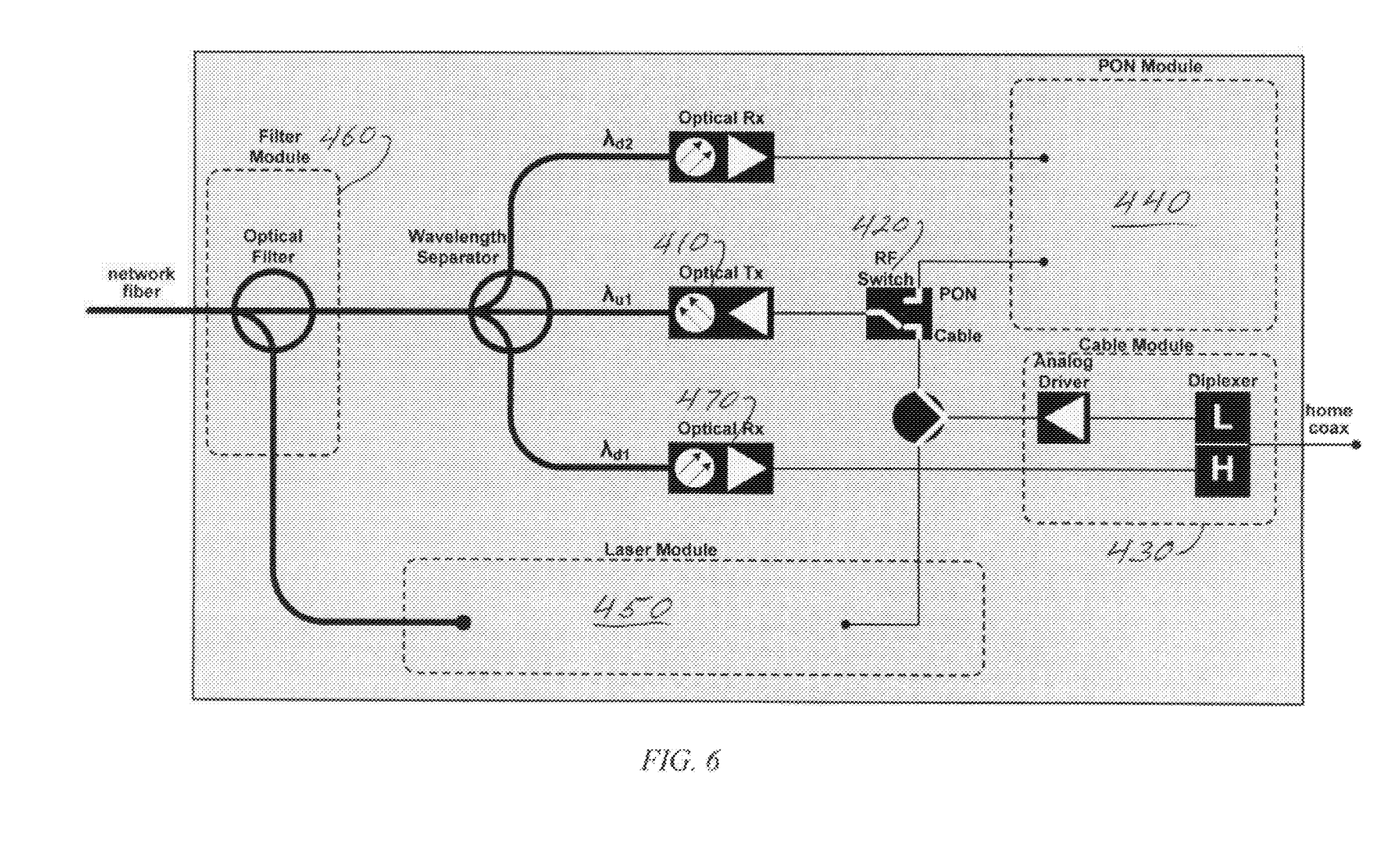
FIG. 6 depicts a smart RFoG CPE device with Cable and Filter modules installed to enable a seamless upgrade to PON service in the future.

FIG. 6 shows the base CPE with Cable module 430 and Filter module 460 installed. If this model of CPE is initially installed, then a future upgrade to PON service can be made without loss of service since the network fiber does not have to be disconnected to insert the optical filter. A PON upgrade would require only the insertion of the Laser and PON modules 450, 440.

CPE Model Equipped with Cable, Filter and PON Modules

Figure 7:
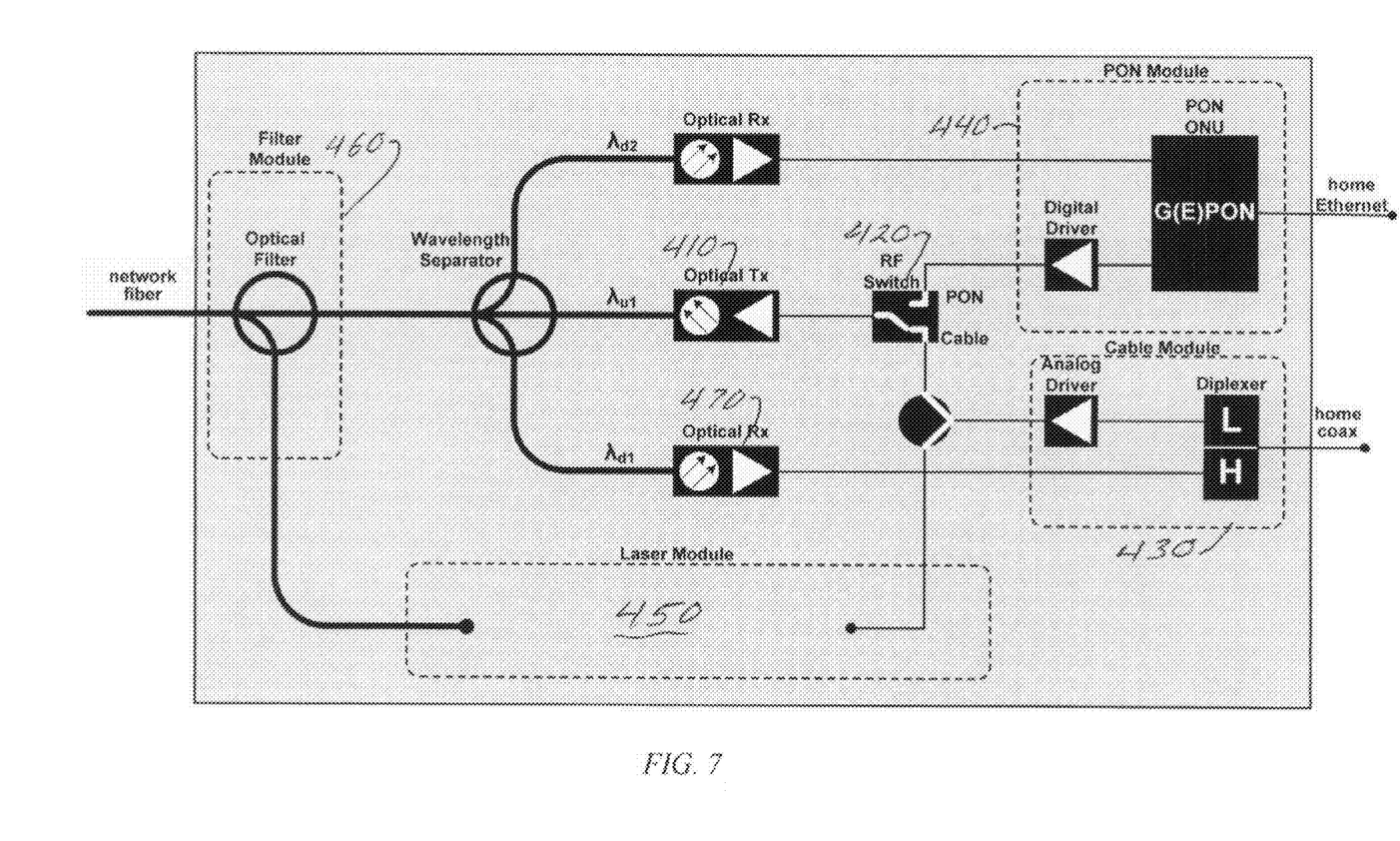
FIG. 7 depicts a smart RFoG CPE device with Cable, Filter and PON modules installed so that a future upgrade to PON service requires only the Laser module.

The PON Module 440 is relatively inexpensive compared to the Laser Module 450; hence, another possibility is for the Cable, Filter and PON modules 430, 460, 440 installed from day one as shown in FIG. 7, with only the Laser Module 450 required for a future PON upgrade.

CPE Model Equipped with Cable and PON Modules

Figure 8:
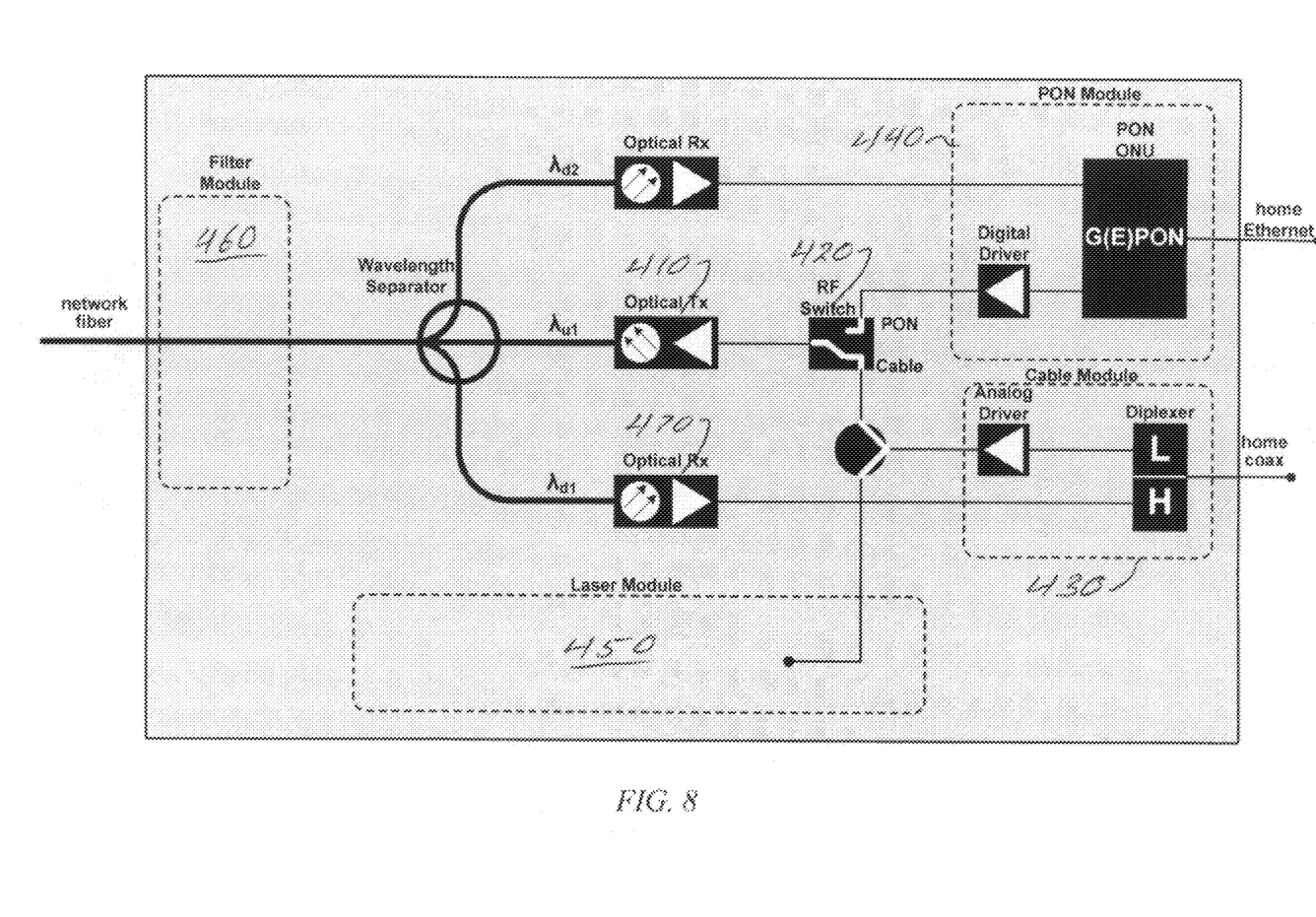
FIG. 8 depicts a smart RFoG CPE device with Cable and PON modules installed so that a future upgrade to PON service requires the Laser and Filter modules.

If the optical filter in the Filter module 460 represents too much initial cost then another possibility is a base CPE with only the Cable and PON modules 430, 440 initially installed, as shown in FIG. 8. The Filter and Laser modules 460, 450 are now required for a PON upgrade.

Fully Equipped CPE Model Providing Traditional Cable and PON Services

Figure 9:
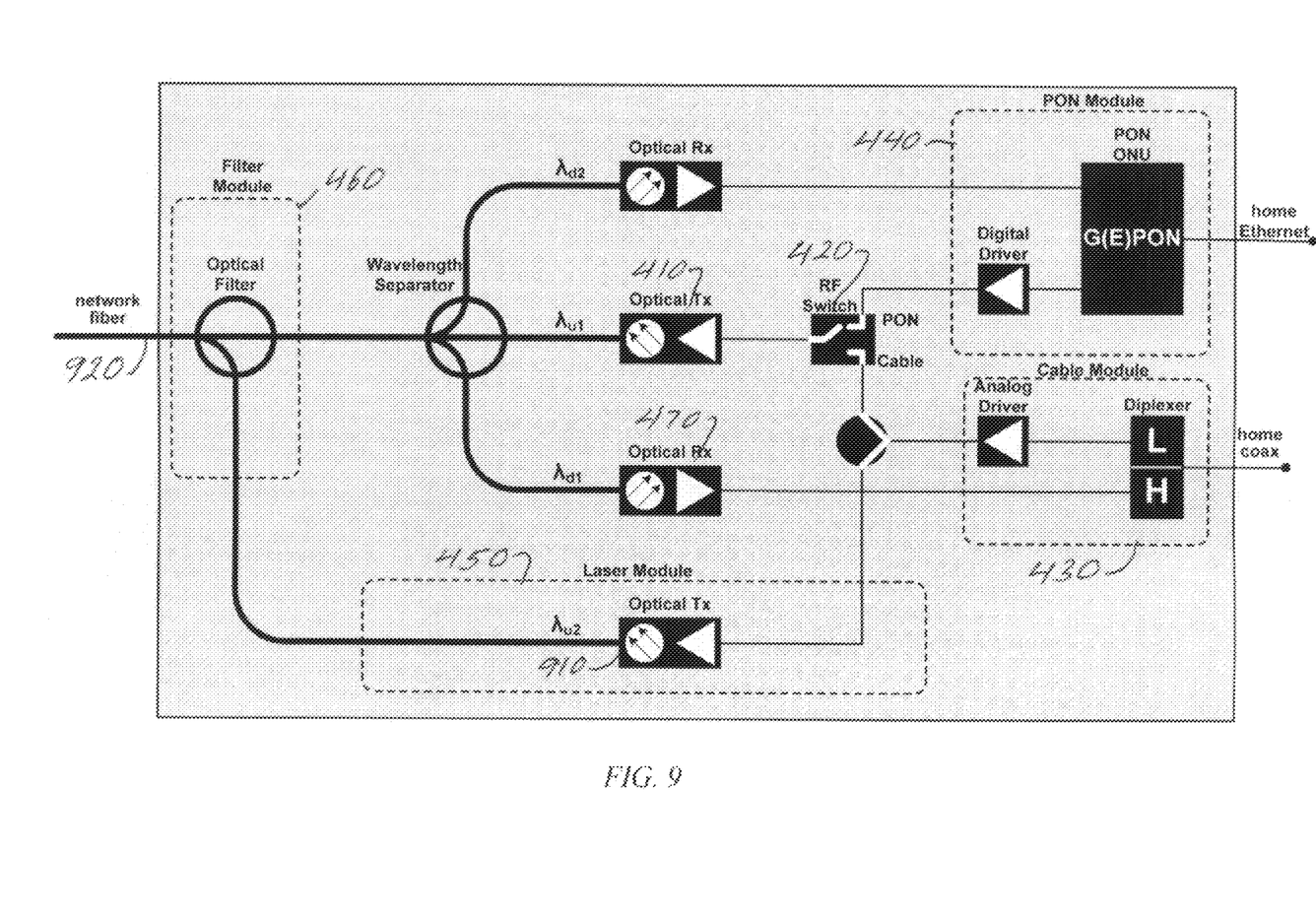
FIG. 9 depicts a smart RFoG CPE device with electrical switch set to "PON" and all modules installed to provide both traditional cable and PON services.

If a customer who initially subscribed only to traditional cable service (any of the models shown in FIGS. 5 to 8) wants to upgrade to PON service at some future time, the electrical switch 420 is switched to the "PON position", and any missing modules inserted into the CPE device resulting in the model shown in FIG. 9. The upstream laser 910 with wavelength $\lambda_{u2}$ now transports the traditional cable return while the laser 410 with wavelength $\lambda_{u1}$ handles the PON upstream data. It can be appreciated that the initial investment in the $\lambda_{u1}$ laser is not stranded.

After the PON upgrade, the single network fiber 920 feeding the CPE will have four wavelengths on it: $\lambda_{d1}$ (video)/$\lambda_{d2}$ (PON) downstream and $\lambda_{u1}$ (PON)/$\lambda_{u2}$ (cable return) upstream.

CPE Model Equipped with Only a PON Module

Figure 10:
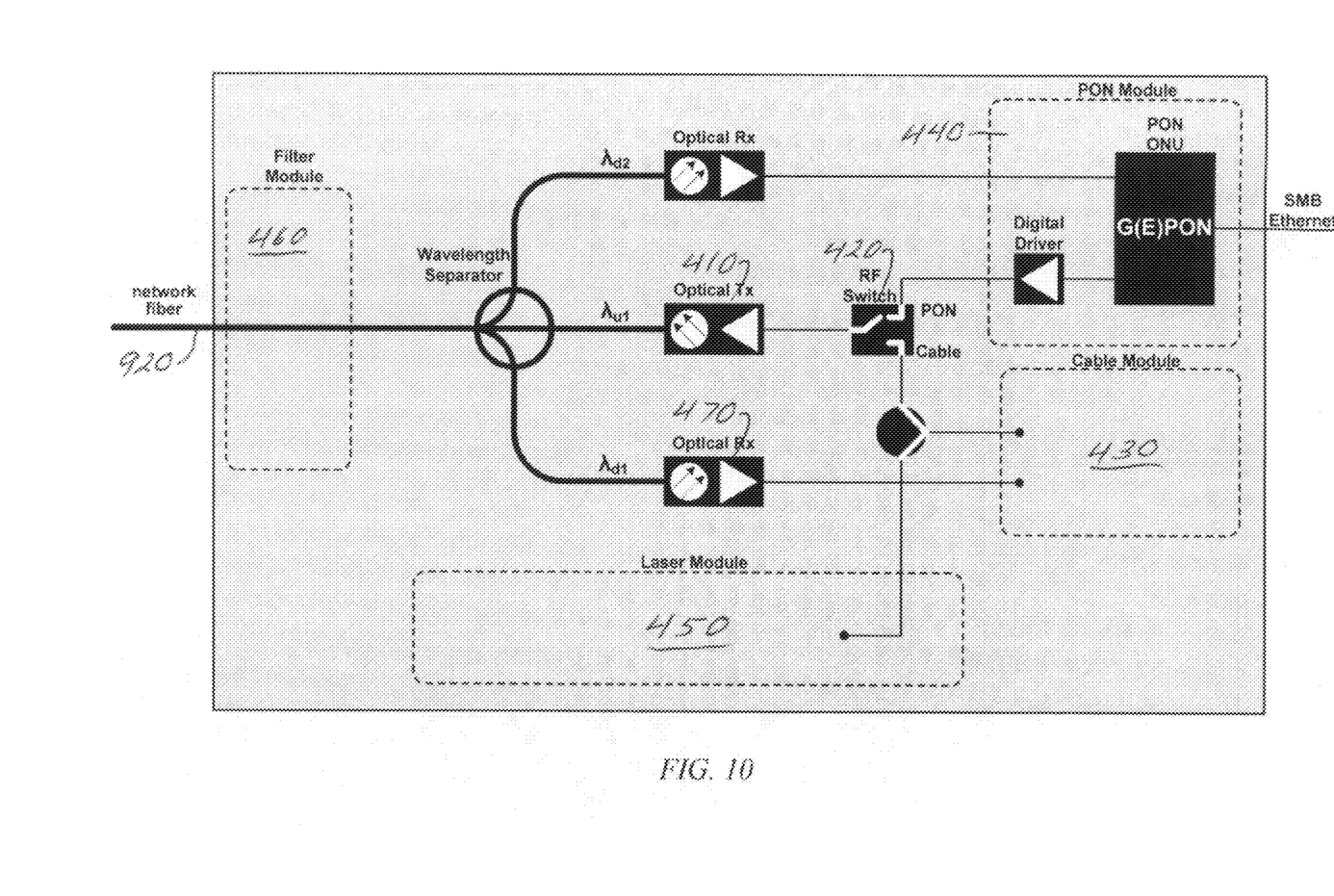
FIG. 10 depicts a smart RFoG CPE device with electrical switch set to "PON" and PON module installed so that only PON service is enabled.

FIG. 10 shows the base CPE with only the PON module 440 inserted and the electrical switch 420 set to the PON position so that only PON service is enabled.

This CPE model would be of interest mostly to SMBs (small medium businesses) but could also be used with those home subscribers who may get their video services from a cable competitor (such as a satellite provider) and want to subscribe only to very high-speed data service. However, as with all other devices presented above, this device is universal and can be upgraded to the version presented in FIG. 9.

CPE Model Equipped with PON and Filter Modules

Figure 11:
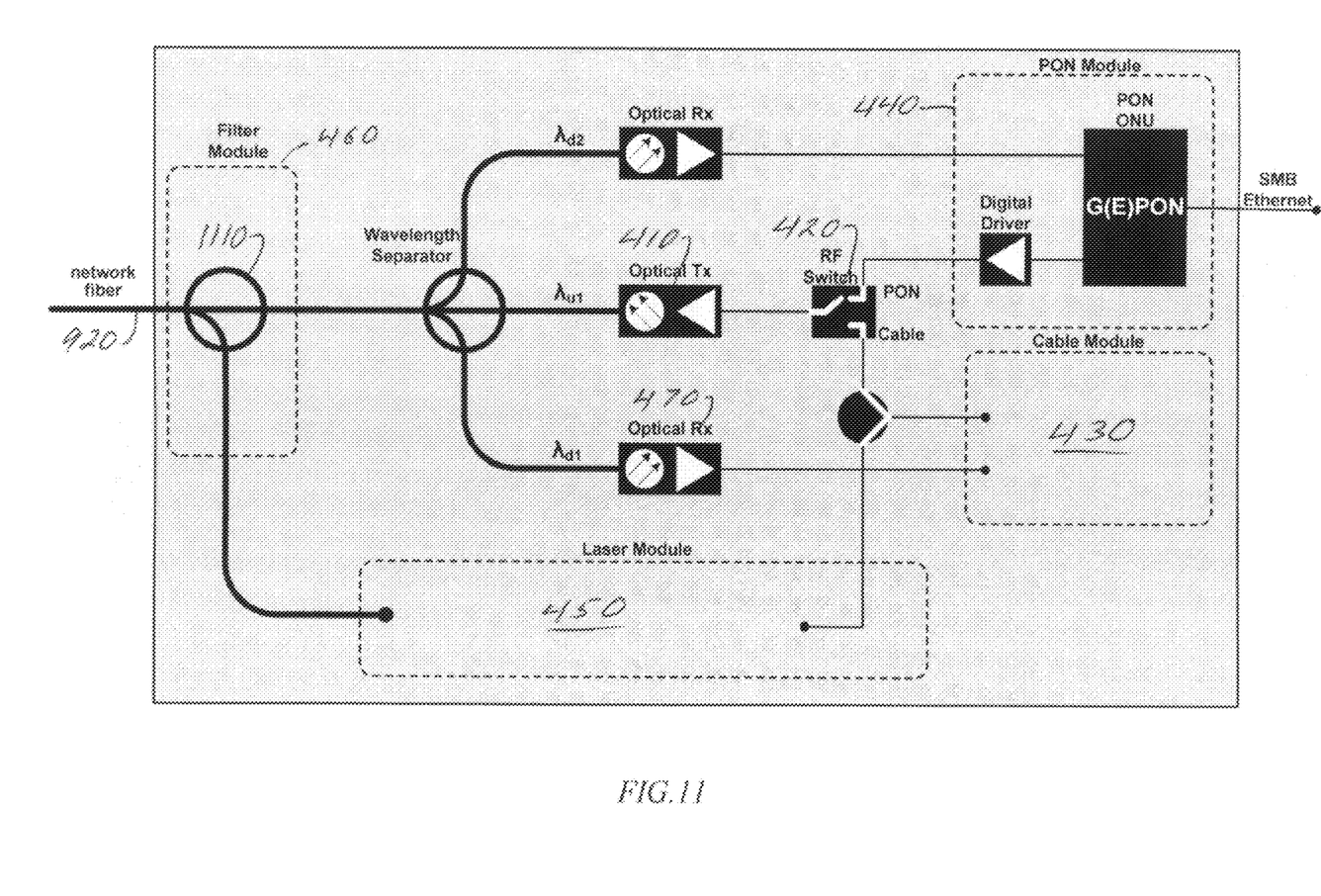
FIG. 11 depicts a smart RFoG CPE device with PON and Filter modules installed for seamless upgrade to traditional cable services in the future.

FIG. 11 shows the base CPE with PON and Filter modules 440, 460 installed. If this model of CPE is initially installed then a future upgrade to traditional cable service can be made without loss of service since the network fiber does not have to be disconnected to insert the optical filter 1110.

CPE Model Equipped with PON Module and Cable Pass-Through

Figure 12:
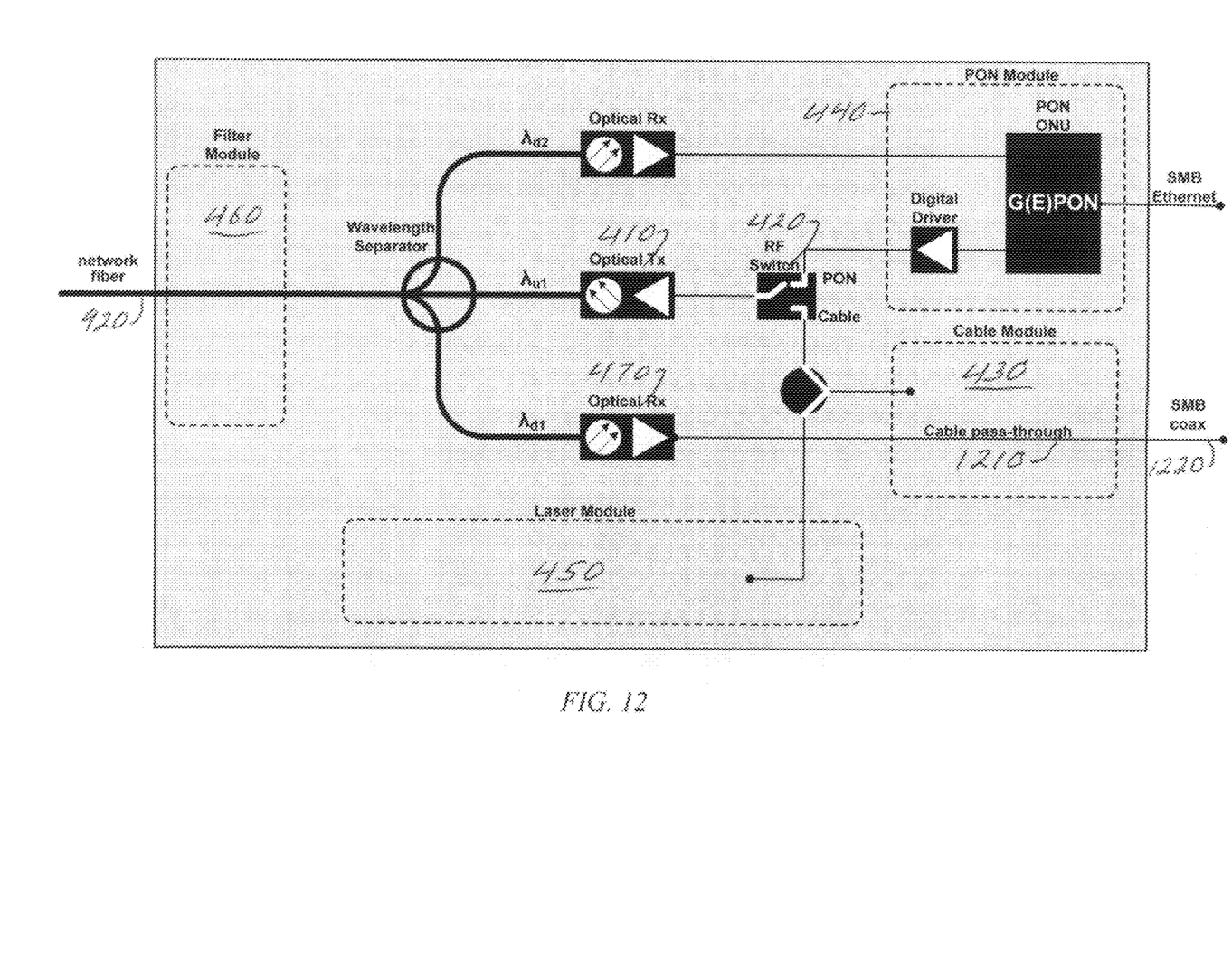
FIG. 12 depicts a smart RFoG CPE unit with PON module and a cable pass-through installed to provide PON and broadcast-only video services.

FIG. 12 shows the base CPE with a PON module 440 and a cable pass-through 1210 installed. The cable pass-through 1210 is a direct connection from the output of the downstream receiver 470 to the home/SMB coax 1220. There is no Laser Module 450 and, consequently, there is no cable return. This means that this CPE model provides only broadcast video in addition to PON service; interactive video services such as video on demand (VOD), pay-per-view (PPV) or DOCSIS services (data, telephony) cannot be provided.

CPE Model Equipped with PON Module and Cable Pass-Through

Figure 13:
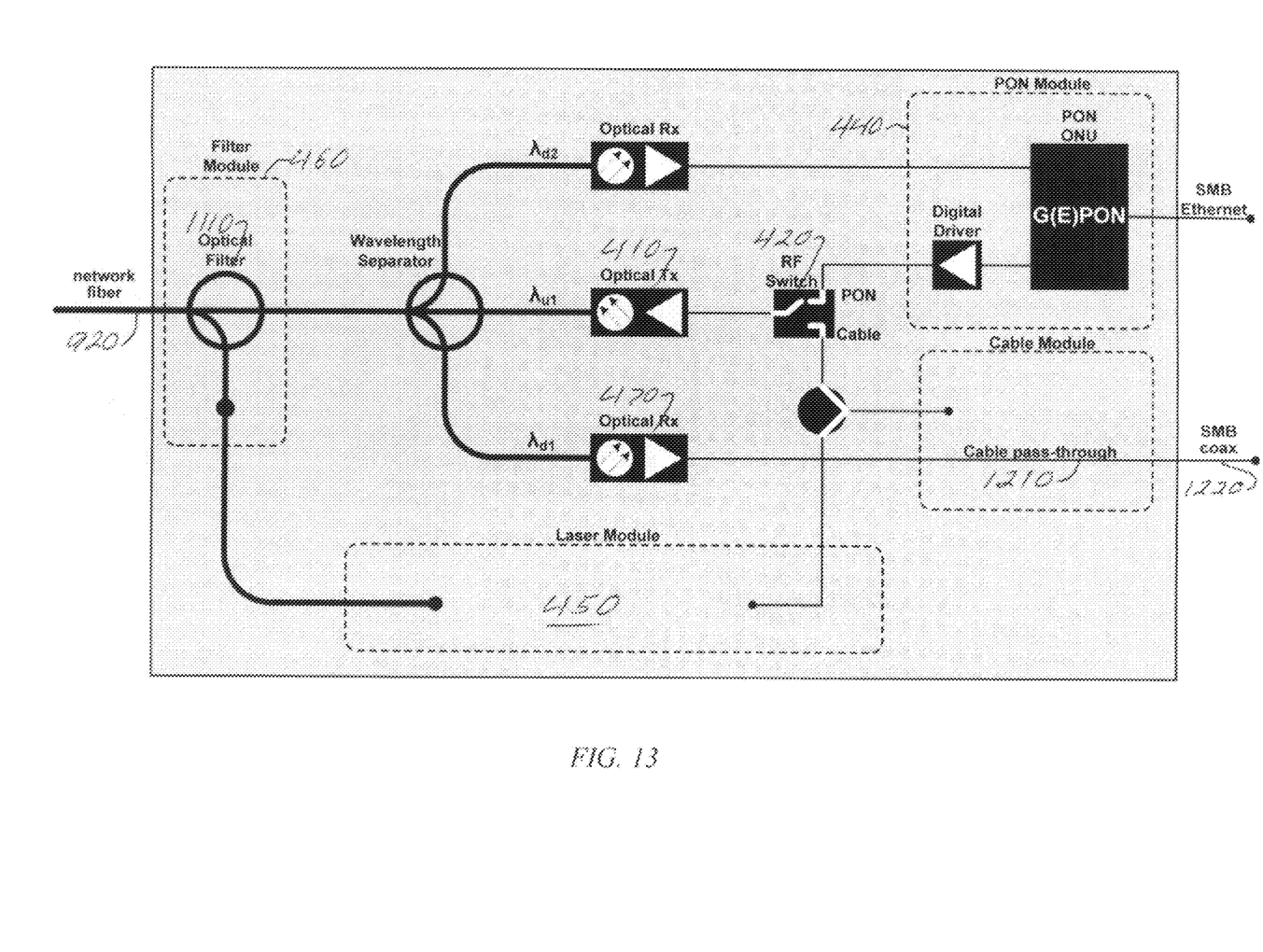
FIG. 13 depicts a smart RFoG CPE unit with PON and Filter modules as well as a cable pass-through installed to provide PON and broadcast-only video services with seamless upgrade to traditional two-way cable services if desired.

FIG. 13 shows the base CPE with PON and Filter modules 440, 460 as well as a cable pass-through 1210 installed. This CPE model provides PON service, broadcast-only video and allows for a seamless upgrade path to interactive video services in the future.

Other variations are also possible (for example, optical receiver as well as optical filter for $\lambda_{d1}$ downstream can be removed and made pluggable from the version presented in FIGS. 10 and 11 if it is cost effective). Broadcast-only video can be provided using a base CPE with only the cable pass-through installed. Or if a SMB or home subscriber who initially signed up for PON or broadcast-only video wants to upgrade to full interactive cable services as well, they can use the fully equipped CPE model shown in FIG. 9.

DEFINITIONS

The term program and/or the phrase computer program are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system). The phrase radio frequency (RF) is intended to mean frequencies less than or equal to approximately 300 GHz as well as the infrared spectrum.

The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term distal, as used herein, is intended to mean far, away, spaced apart from and/or non-coincident, and includes spatial situation where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub)method, (sub)process and/or (sub)routine for achieving the recited result.

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The terms "consisting" (consists, consisted) and/or "composing" (composes, composed) are intended to mean closed language that does not leave the recited method, apparatus or composition to the inclusion of procedures, structure(s) and/or ingredient(s) other than those recited except for ancillaries, adjuncts and/or impurities ordinarily associated therewith. The recital of the term "essentially" along with the term "consisting" (consists, consisted) and/or "composing" (composes, composed), is intended to mean modified close language that leaves the recited method, apparatus and/or composition open only for the inclusion of unspecified procedure(s), structure(s) and/or ingredient(s) which do not materially affect the basic novel characteristics of the recited method, apparatus and/or composition.

Unless otherwise defined, all technical and scientific terms used herein have the same meaning as commonly understood by one of ordinary skill in the art to which this invention belongs. In case of conflict, the present specification, including definitions, will control.

CONCLUSION

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor(s) is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences. The individual components of embodiments of the invention need not be formed in the disclosed shapes, or combined in the disclosed configurations, but could be provided in any and all shapes, and/or combined in any and all configurations.

Various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising: operating a customer premises equipment device including:
   separating downstream services using a wavelength separator between a first receiver and a second receiver;
   transporting upstream cable return services with an upstream laser through the wavelength separator; and
   switching a drive source for the upstream laser including setting a managed electrical switch to i) a cable position driven by an analog driver providing traditional cable services and upstream signals or ii) a PON position driven by a digital driver providing high-speed G(E)PON service, to reuse a wavelength of the upstream laser;
   wherein a) the digital driver is located in a removable PON module that is located in the customer premises equipment device and coupled to the first receiver, b) the analog driver is located in a removable cable module that is located in the customer premises equipment device and coupled to the second receiver and c) an RF splitter is coupled between the managed electrical switch and the removable cable module.

2. An apparatus, comprising: a customer premises equipment device including:
   a wavelength separator; a first receiver coupled to the wavelength separator; a second receiver coupled to the wavelength separator;
   a upstream laser coupled to the wavelength separator for transporting upstream cable return services; and
   a managed electrical switch coupled to the upstream laser that is set to i) a cable position driven by an analog driver providing traditional cable services and upstream signals or ii) a PON position driven by a digital driver providing high-speed G(E)PON service, to reuse a wavelength of the upstream laser;
   wherein a) the digital driver is located in a removable PON module that is located in the customer premises equipment device and coupled to the first receiver, b) the analog driver is located in a removable cable module that is located in the customer premises equipment device and coupled to the second receiver and c) an RF splitter is coupled between the managed electrical switch and the removable cable module.

3. An RFoG network, comprising the apparatus of claim 2.

4. The apparatus of claim 2, further comprising a filter module coupled to the wavelength separator.

5. The apparatus of claim 4, further comprising a laser module coupled between the removable cable module and the filter module.

* * * * *